Figure 1:
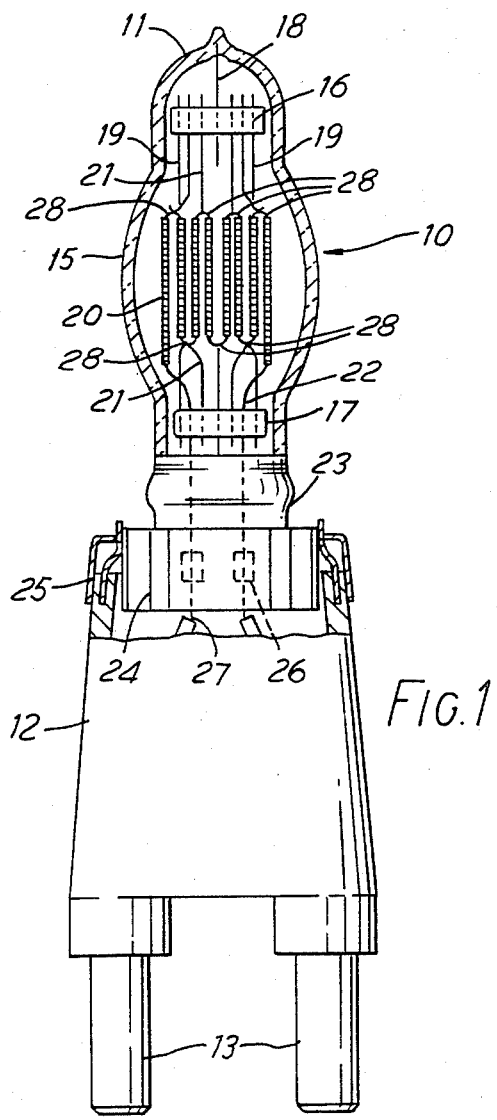

United States Patent [19]

Connor et al.

[11] Patent Number: 4,743,802
[45] Date of Patent: May 10, 1988

[54] TUNGSTEN HALOGEN INCANDESCENT LAMP WITH ARC PREVENTING FILL

[75] Inventors: Ian Connor, Leicester; Roger A. Hume, Melton Mowbray, both of England

[73] Assignee: Thorn EMI plc, London, England

[21] Appl. No.: 870,665

[22] Filed: Jun. 2, 1986

Related U.S. Application Data

[63] Continuation of Ser. No. 574,611, Jan. 27, 1984, abandoned.

[30] Foreign Application Priority Data

Jan. 29, 1983 [GB] United Kingdom ............... 8302494

[51] Int. Cl.$^4$ .............................................. H01K 1/50
[52] U.S. Cl. ................................... 313/579; 313/569; 313/637
[58] Field of Search ............... 313/568, 569, 570, 572, 313/576, 578, 579, 637, 643

[56] References Cited

U.S. PATENT DOCUMENTS 3,912,961 10/1975 Rees et al. ............................ 313/579
4,450,381 5/1984 Kendrick et al. ................... 313/579

FOREIGN PATENT DOCUMENTS 879062 10/1961 United Kingdom .
1195109 6/1970 United Kingdom .
1337400 11/1973 United Kingdom .
1387240 3/1975 United Kingdom .
1480361 7/1977 United Kingdom .

Primary Examiner—David K. Moore
Assistant Examiner—K. Wieder
Attorney, Agent, or Firm—Fleit, Jacobson, Cohn & Price

[57] ABSTRACT

A tungsten halogen incandescent filament lamp is provided having a fill of inert gas and halogen. In such lamps and especially in lamps provided for studio and theatre applications having operating temperatures between 2200K and 3450K there is a tendency to arc over between the filament limbs. According to the invention this problem can be solved by adding hydrogen gas in an amount between 0.05% and 1% by pressure at 20° C. This hydrogen gas is in addition to any hydrogen which is present as part of the halogen or halogens. A preferred halogen is the solid hydrogen, bromophosphonitrile $(PN Br_2)_n$ which introduces phosphorus as a getter into the lamp.

7 Claims, 1 Drawing Sheet

TUNGSTEN HALOGEN INCANDESCENT LAMP WITH ARC PREVENTING FILL

This application is a continuation of application Ser. No. 574,611, filed Jan. 27, 1984 now abandoned.

The present invention relates to tungsten halogen electric incandescent filament lamps. Such lamps have a tungsten filament enclosed within a light transmitting envelope containing a fill of an inert gas, such as, for example, $N_2$ Ar, Kr or Xe and a small quantity of halogen. The halogen can be introduced in several different forms such as, for example gaseous halide, HBr; $CH_2Br_2$; $CH_3Br$; $CHBr_3$; or solid halide such as $C_6Br_6$; $C_6H_2Br_4$ or $(PN\ Br_2)_n$(Bromophosphonitrile). (It has been found that the value of n in the latter formula cannot be specified but this is of no importance). The lamps can be dosed with the selected fill using either a hot or cold processing technique. In the hot process, the lamp envelope is exhausted and heated to about 800° C. whilst the filament is lit by application of about 20% of its rated voltage. After the lamp envelope has cooled, it is flushed and evacuated and filled with fill gas and gaseous halogen. This overall process takes about 20 minutes for each lamp. Cold processing requires no bulb heating or filament light up and allows the use of a dose of solid halogen, such as, for example Bromophosphonitrile dissolved in a suitable carrier. The carrier can subsequently be evaporated and this provides a much more accurate method of dosing. In addition, cold dosing with Bromophosphonitrile allows phosphorous to be introduced as a getter. Other suitable getters may be used. Moreover, the overall individual lamp processing time is less than with hot processing.

An alternative cold exhaust process can also optionally be used. In this case gaseous or solid halogens or a combination of both can be used in conjunction with the inert gas filling.

A problem with tungsten halogen incandescent filament lamps, whose filaments operate between 2200K and 3450K, is arc over between the filament limbs or filament turns, which leads to premature failure and which occurs irrespective of exhaust procedure. We have certainly found, however, that the problem is more pronounced at increased filament operating temperatures and when using cold processing techniques.

The present invention has been found particularly useful in solving our problems in high power studio and theatre lamps using either mono-plane or bi-plane grid filaments but the particular shape of filament is not believed to be critical to the present invention.

Studio lamps differ from theatre lamps in that the former have filaments designed to run at about 3200K with a life of 2–400 hours, while the latter have filaments designed to run at about 2950K with a life of about 750 hours. However, constructionally, apart from the filament, they are substantially identical and do not differ with respect to use of the present invention.

According to the present invention, there is provided a tungsten halogen electric incandescent filament lamp having a fill comprising halogen and an inert gas, the halogen being present in a range to provide between 2 microgrammes per millilitre and 70 microgrammes per millilitre of halogen and the inert gas being present at a filling pressure between 0.5 and 5 atmospheres at 20° C., and in addition to any hydrogen present as part of the halogen there is included hydrogen gas in the quantity between 0.05% and 1% by pressure at 20° C.

According to a further aspect of the invention, there is provided a method of manufacturing a tungsten halogen electric incandescent filament lamp, the lamp envelope including a fill comprising between 2 microgrammes per milliliter ($\mu$g/ml) and 70 $\mu$g/ml of halogen and an inert gas present at a filling pressure of between 0.5 and 5 atmospheres at 20° C., the method comprising the steps of evacuating and flushing the lamp envelope with an inert gas, filling the lamp envelope with a selected fill of halogen, inert gas and hydrogen, wherein the amount of hydrogen gas is between 0.05% and 1% by pressure of the lamp fill at 20° C. and said amount is in addition to any hydrogen present as part of the halogen.

Our preferred method is the cold processing technique involving a cold exhaust with the addition of a solid dose of halide containing a getter. Other techniques can comprise a pre-heating (to drive off water) before a cold exhaust and a hot exhaust where heat is applied (to drive off water) during the exhaust process.

The properties of hydrogen as an arc suppressant are known, being mentioned, for example, in a UK Patent No. 1,387,240, and also it is known that hydrogen influences the tungsten transport cycle. Moreover, it is further known that the addition of any of the halogens; fluorine, chlorine or bromine; improves the life of the lamp but that precautions must be taken to protect the metallic members such as filament supports, filament limbs, or lead-in wires from corrosion and it has been suggested (see UK Patent No. 1,195,109) that the addition of hydrogen can assist in preventing such corrosion. A further problem encountered in tungsten halogen incandescent filament lamps, particularly high power lamps having filament temperatures of 2200K to 3450K, is blackening of the envelope wall (see UK Patent No. 1,480,361).

In most of these prior art Patents, for example 1,480,361 and 1,387,240, hydrogen is added as part of a halogen compound. In UK Patent No. 1,195,109, it is suggested that hydrogen is included in the inert gas. However, the teaching of this patent is that any hydrogen present will escape through the molecular structure of the fused quartz wall and that the effect of the hydrogen will disappear with time. This is contrary to our findings, which are that not only does the hydrogen in the quantities mentioned above assist in solving the arcing problem, but hydrogen is retained sufficiently so that lamps treated in accordance with the invention exhibit unexpected substantial increases in life and do not suffer from blackening problems.

The method of dosing the lamp is by the addition of gaseous hydrogen, since if hydrogen is added as part of a halogen compound, the additional halogen tends either to upset the balance of the tungsten transport cycle or causes further corrosion problems or both.

A preferred range of hydrogen is between 0.05% and 1% by pressure of the lamp fill at 20° C. since we have found that with less than 0.05%, arcing can still occur and with over 1%, blackening of the lamp envelopes occurs.

One embodiment of the invention will now be described, by way of example only, with reference to the single FIGURE of the accompanying drawing which shows a front view of a 2000 watt lamp for studio and theatre lighting, embodying the invention.

The lamp bulb comprises a generally tubular quartz envelope (10) sealed at both ends, one end of which is supported in an insulating cap (12). The cap (12) has two conductive pins (13) for connection to the supply.

The lamp envelope (10) has a central portion (15) which is of a larger diameter than the rest of the tube and is circularly symmetrical about the longitudinal axis of the envelope (10). However, straight sided tubular envelopes may also be used.

A filament support frame within the envelope (10) includes two transverse quartz bridges (16 and 17). One of the bridges (16) is connected by a wire (18) to the closed end (11) of the envelope. The bridges are interconnected by two wires (19).

A single coil planar filament (20) is supported between the quartz bridges (16 and 17) on support wires (21). The filament is attached at each end to a filament lead wire (22).

The lead wires (22) pass through the quartz bridge (17) and then into a pinch seal (23) where they are welded to molybdenum foils (26) which in turn are welded to outer lead wires (27). The molybdenum foil is the effective vacuum tight seal of the lamp. The pinch seal (22) is held in a metal frame (24) which is fixed into the insulating cap (12). An apertured cover (25) fits over the top of the cap (12). The outer lead wires (27) are then connected to the pins (13). As previously stated a problem with tungsten halogen incandescent filament lamps which operate at filament temperatures between 2200K and 3450K is arc over between the filament limbs 28.

In manufacturing the lamp illustrated, the central part of the envelope is first blown out to an approximately part-spherical or pear shaped contour and an exhaust tube fitted at 11. The filament is pre-assembled onto the filament support frame and this is then positioned within the envelope so that the filament itself is within the blown-out portion of the envelope. The pinch seal (23) is then made and the envelope evacuated and filled with the selected halogen additive and inert gas and hydrogen. The exhaust tube is then sealed at 11. The envelope is then fixed into the cap (12).

Generally lamps can be filled with a suitable gas mix comprising hydrogen and an inert gas. The halogen should be present in the range 2 $\mu g/ml$ and 70 $\mu g/ml$ and the inert gas cold filling pressure should be between 0.5 and 5 atmospheres at 20° C. (i.e. room tempeature). The inert gas may be selected from the rate gases argon, krypton and xenon or nitrogen (either individually or in combination), the latter being most used and the halogen may be introduced in several forms, preferably $HBr$, $CH_2Br_2$, $CH_3Br$, $CHBr_3$, $C_6Br_6$, $C_6H_2Br_4$ or $(PNBr_2)_n$, either individually or in combination. The halogen may be introduced either directly as gaseous halogen or by means of a solid halogen compound or by a combination of both.

Finally in accordance with the present invention there is added gaseous hydrogen ($H_2$) in a quantity between 0.05 and 1% by pressure at 20° C. which is in addition to any hydrogen content of the halogen.

EXAMPLE 1

The fill of a 2kW studio lamp having an internal volume of 55 ml is nitrogen at a gas filling pressure of 1.8 atmospheres at 20° C., together with a 0.1% of $H_2$ and 0.3% of HBr, by pressure at 20° C. In addition, the lamp contains about 135 g of (PN BR$_2$)n which introduces phosphorus as a getter. A number of such lamps have been tested and arcing problems have been substantially eliminated. A substantial increase, for example 30%, in average achieved life of lamps has also been observed.

EXAMPLE 2

A 1 kW theatre lamp having an internal volume of 30 ml, a gas filling pressure 2.3 atmospheres of nitrogen at 20° C., together with 0.5% hydrogen gas by pressure at 20° C. In addition, the lamp contains about 200 g of $(PNBr_2)_n$ which introduces phosphorus as a getter.

EXAMPLE 3

A 5kW studio lamp having an internal volume of 200 ml, a gas filling pressure of 0.85 atmospheres nitrogen at 20° C., together with 0.3% of $H_2$ and 0.6% HBr, both by pressure at 20° C.

In the manufacture of the lamp, it has been found to be preferable to evacuate the lamp envelope and flush it with an inert gas one or more times before filling it with the selected fill of halogen and inert gas with the specified additional hydrogen.

The invention has been found to be particularly applicable to studio or theatre lamps in the range of 300 watts to 10 kW, although it may be applied to other lamps.

Other examples will be apparent to those skilled in the art.

We claim:

1. A tungsten halogen electric incandescent filament lamp comprising a lamp envelope of quartz material having a fill comprising halogen and an inert gas, the halogen being present in a range to provide between 2 microgrammes per milliliter and 70 microgrammes per milliliter of halogen and the inert gas being present at a filling pressure between 0.5 and 5 atmospheres at 20° C., and in addition to any hydrogen present as part of the halogen there is included hydrogen gas in the quantity between 0.05% and 1% by pressure at 20° C. whereby sufficient hydrogen is retained within the quartz envelope to prevent arcing.

2. A tungsten halogen electric incandescent filament lamp according to claim 1 wherein the halogen is selected from HBr; $CH_2 Br_2$; $CH_3 Br$; $CH Br_3$; $C_6 Br_6$; $C_6 H_2 Br_4$ or $(PN Br_2)_n$ individually or in combination.

3. A tungsten halogen electric incandescent filament lamp according to claim 1 wherein the inert gas is selected from the group consisting of $N_2$; Ar; Kr or Xe, individually or in combination.

4. A tungsten halogen electric incandescent filament lamp according to claim 1, having a fill of nitrogen at a gas filling pressure of 1.8 atmospheres at 20° C. together with 0.1% of hydrogen gas and 0.3% of HB$_r$, each by pressure at 20° C. and substantially 135 microgrammes of $(PN Br_2)_n$.

5. A tungsten halogen electric incandescent filament lamp according to claim 1, having a fill of nitrogen at a gas filling pressure of 2.3 atmospheres at 20° C. together with 0.5% of hydrogen gas by pressure at 20° C. and substantially 200 microgrammes of $(PN Br_2)_n$.

6. A tungsten halogen electric incandescent filament lamp according to claim 1, having a fill of nitrogen at a gas filling pressure of 0.85 atmospheres at 20° C. together with a 0.3% hydrogen gas and 0.6% HBr, each by pressure at 20° C.

7. A tungsten halogen electric incandescent filament lamp according to claim 1 having a lamp envelope volume selected from the group consisting of 30, 55 and 200 milliliters.

* * * * *